No. 793,046. PATENTED JUNE 27, 1905.
W. H. BROOKS.
APPARATUS FOR THE GENERATION OF GAS.
APPLICATION FILED SEPT. 26, 1904.
2 SHEETS—SHEET 1.
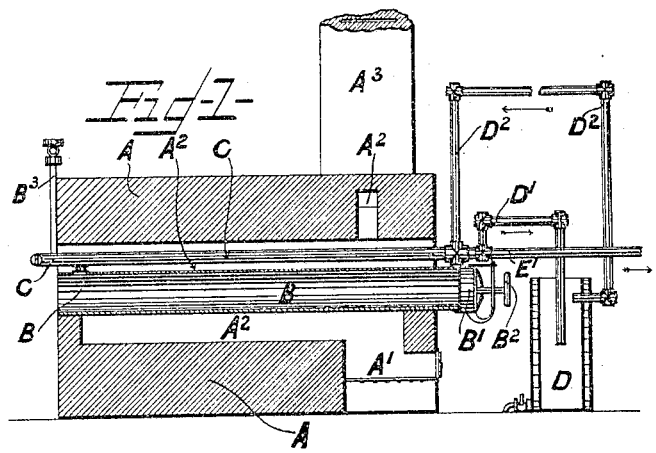
Fig-1-
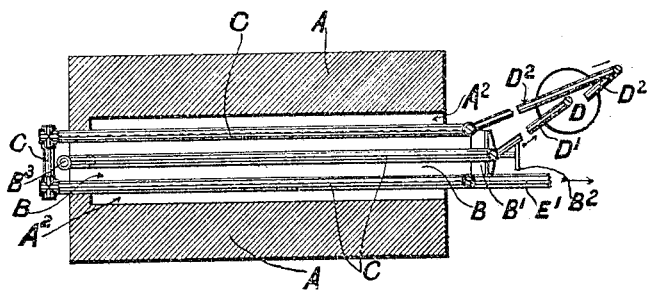
Fig-2-
Witnesses.
Harry L. Ames.
C. P. Sommers.
Inventor.
William Henry Brooks.
by Henry Orth
attys.

No. 793,046. PATENTED JUNE 27, 1905.
W. H. BROOKS.
APPARATUS FOR THE GENERATION OF GAS.
APPLICATION FILED SEPT. 26, 1904.
2 SHEETS—SHEET 2.
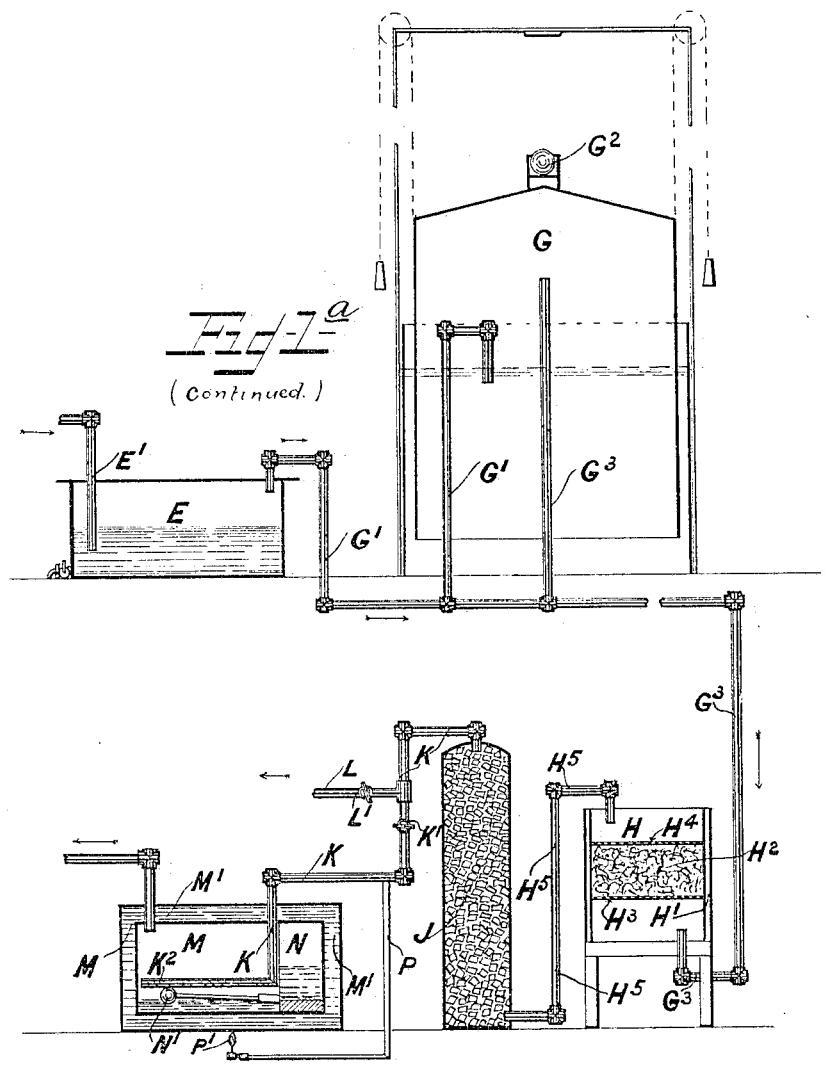
Fig-1ª
(Continued.)
Witnesses.
Harry L. Amer.
R. W. Dommers
Inventor.
William Henry Brooks,
by Henry Orth attys.

No. 793,046. Patented June 27, 1905.

UNITED STATES PATENT OFFICE.

WILLIAM HENRY BROOKS, OF ADELAIDE, SOUTH AUSTRALIA, AUSTRALIA.

APPARATUS FOR THE GENERATION OF GAS.

SPECIFICATION forming part of Letters Patent No. 793,046, dated June 27, 1905.

Application filed September 26, 1904. Serial No. 226,033.

*To all whom it may concern:*

Be it known that I, WILLIAM HENRY BROOKS, agent, a subject of the King of Great Britain, residing at Victoria Square, West, Adelaide, in the State of South Australia, in the Commonwealth of Australia, have invented certain new and useful Improvements in Apparatus for the Generation of Gas, of which the following is a specification.

My invention relates to certain improvements in apparatus comprising a plant for the generation of gas, and refers more particularly to a plant for the generation of gas from wood for illuminating, heating, and power purposes.

The object of my invention is to provide a plant which well adapts itself for private installations and for the use of householders in outlying parts for the generation of gas free from tar and other impurities, being thereby suitable for power purposes, while at the same time the gas may be used for heating and illumination with incandescent burners or after enrichment in ordinary open burners. I accomplish this object by providing certain improvements in the particular combination and arrangement of retorts and furnaces, connecting-pipes, a condenser, washer, gasometer, scrubbers, and enricher, comprising a plant as hereinafter described.

In a plant constructed according to my invention the pipes leading from the retorts are caused to pass through the flues of the furnace, whereby the impurities in the gas, which are usually liquid, (such as tar, &c.,) are subjected to an additional heating, rendering them solid and friable and capable of easy discharge, with at the same time a corresponding increase in the amount of gas generated. The gas then passes through suitable condensers and washers to a gasometer, from which it is withdrawn through scrubbers, as required. When used for power purposes or for illumination with incandescent burners, the gas is used direct as drawn through the scrubbers; but when used with ordinary open burners it is passed through an enricher, as hereinafter described.

In order that my invention may be the better understood, I will now proceed to describe the same with reference to the accompanying drawings, in which—

Figures 1 and 1$^a$ are side sectional elevations of a plant shown diagrammatically, while Fig. 2 is a plan in section of the furnace and retort, showing the arrangement of the pipes within the flue.

A is the furnace, constructed, preferably, of masonry, having a fire-box A', preferably lined with fire-brick and covered with asbestos for the purpose of conserving the heat. This furnace A is provided with a flue A$^2$, leading to a stack A$^3$ in the ordinary way. Above the fire-box A' is mounted one or more retort-tubes B, preferably of fire-clay. These retort-tubes B are provided with removable covers B' at one end, held in place by screw-clamps B$^2$, by which the charge of wood or other fuel is inserted, from which the gas is to be generated. An upwardly-projecting blow-off pipe B$^3$ is provided for the discharge of the air immediately after charging the retort and for use as may be required. At one end, and by preference that opposite to the fire-box A', the retort-tube B is connected to a series of pipes C, arranged horizontally within the flue A$^2$ above the fire-box A'. In the accompanying drawings three of such horizontal pipes C are arranged; but it will be well understood that any number may be provided, as required in practice.

The gas generated in the retort-tube B discharges into the central pipe C and passes therefrom, by means of a connecting-pipe D', to a condenser D. This condenser D is water-jacketed, as shown in section, for the purpose of keeping it cool and discharges, by means of a pipe D$^2$, back to the side pipes C, arranged within the flue A$^2$. In this way the major portion of the solid constituents carried over with the gas are subjected to further additional heating within these pipes C, whereby the tar and other impurities are rendered dry and friable. The pipes C are provided with rectangular joints, with screw-plugs at each end, whereby they may be cleaned out with facility, and the solid impurities, being collected in a dry and friable state, are easily discharged, while at the same time gases otherwise occluded within the tar and liquid impurities are liberated with a corresponding increase of the gas produced. The gas then passes from one of the side tubes C, by means of a pipe E', to a washer E, of ordinary construction, where it is caused to pass through a head of water, being thereby cooled and a portion of the tar and other impurities eliminated. Within this washer E, if necessary, any suitable chemical solution may be provided for effecting the purpose. From the washer E the gas passes, by means of a pipe G', to a gasometer G. The gasometer G is provided with a valve $G^2$ at the top, which engages the framework when the dome rises to a sufficient extent. Any surplus gas generated is thus released.

Passing from the gasometer G is a delivery-pipe $G^3$, leading to a series of scrubbers for the final elimination of the impurities. I preferably provide two scrubbers, one consisting of a box or receptacle H, water-jacketed by means of a space H' and having a layer of seaweed and sawdust $H^2$ contained between the two perforated plates $H^3$ and $H^4$. The gas discharges into a space beneath the lowermost perforated tray $H^3$ and then works its way upward through the seaweed and sawdust $H^2$ and passing through the perforated plate $H^4$ is delivered, by means of the pipe $H^5$, to the second scrubber J. This second scrubber J consists of a tall box arranged vertically, packed with coke, charcoal, or other convenient medium. The gas is delivered into the bottom of this box J and passes out at the top through a pipe K. The said pipe K is provided with a branch pipe L, while two stop-cocks K' and L' are provided, whereby the gas may be directed through either the pipes K or L, as may be required. The pipe L is for the purpose of utilizing the gas for power purposes or for illumination with incandescent burners, while the pipe K conducts the gas to an enricher for use in ordinary open burners.

It is found in practice that the gas delivering from the pipe L when generated from wood charged into the retort B after passing through the plant, as above described, is very free from impurities and highly suitable for power purposes in a gas-engine or other convenient means and for illumination with incandescent burners and also for heating purposes, such as cooking, &c.

The pipe K leads to an enricher, whereby the gas is sufficiently enriched with gasolene or other volatile enriching-oils. This enricher consists of a box or receptacle M, surrounded by a water-jacket M'. At one side of the box or receptacle M is provided a cistern N for containing the gasolene or other volatile enriching-oils, having a ball-cock N' for the discharge of the contents into the receptacle M. The ball-cock N' thus always maintains within the bottom of the receptacle M a constant level of the gasolene or other volatile enriching-oils. The pipe K delivers into the box or receptacle M and is provided with a horizontal perforated pipe $K^2$, arranged just above the level of the enriching-oils contained in the bottom of the same. In this way the gas is delivered above the surface of the enriching-oils, and is enriched with the gases arising from the same, being thereby enriched at a comparatively light cost.

For the purpose of maintaining the enriching-oils within the box or receptacle N at a uniform temperature, and thereby insuring the constant distillation of enriching-gases therefrom, a branch pipe P is provided leading from the pipe K and having a burner P' arranged immediately beneath the enriching-box M, whereby the water within the jacket M' is maintained at a uniform temperature.

By reference to the accompanying drawings it will be seen that all the unions and angles of the connecting-pipes are made rectangular and are provided with screw-plugs upon each side whereby they may be conveniently cleaned at suitable intervals.

By the arrangement of the plant as above described I am enabled to generate gas from wood at a comparatively low price, being very suitable for power purposes, illuminating, heating, and other domestic purposes, and being particularly adaptable for private installations for the use of householders in outlying parts.

Having now particularly described and ascertained the nature of my said invention and in what manner the same is to be performed, I declare that what I claim is—

1. The combination with a furnace, of a retort directly acted upon by the flame of said furnace, a condenser, a pipe leading from the rear of the retort through the furnace to the condenser, a plurality of pipes forming a continuous passage located within the furnace and heated by the products of combustion and conducting the gas from said condenser, a washer connected to said pipe, a gas-holder connected to the washer, a scrubber having a pipe connection with the gas-holder and a carbureter connected to the scrubber, substantially as described.

2. The combination with a furnace, of a retort heated thereby, a condenser, a pipe passing through the furnace and connecting the rear of the retort with the condenser, a washer, a pipe connecting the condenser and washer located within and heated by the furnace, a gas-holder connected to the washer, means to vent the gas-holder when it contains a predetermined quantity of gas, a scrubber connected to the holder, a second scrubber connected to the first one and containing loose solid material, and a heated carbureter to receive the gas from the second scrubber, substantially as described.

3. The combination with a furnace, of a retort therein, a condenser, a pipe passing through the furnace and connecting the rear of the retort with the condenser, a pipe connecting the condenser and washer and passing through the furnace, a gas-holder to receive the gas from the washer, a pair of scrubbers, a carbureter, means to deliver the gas on the surface of the liquid in the carbureter, a gas-pipe having a burner to heat the carbureter and using gas direct from the scrubber, a gas-main leading from the carbureter and an auxiliary pipe leading to said main to carry gas directly from the scrubber, substantially as described.

In testimony whereof I have hereunto set my hand in presence of two subscribing witnesses.

WILLIAM HENRY BROOKS.

Witnesses:
CHARLES STANLEY BURGESS,
ARTHUR WHITRIDGE BOWEN.